United States Patent
Mercuri

Patent Number: 6,087,034
Date of Patent: Jul. 11, 2000

[54] FLEXIBLE GRAPHITE COMPOSITE

[75] Inventor: Robert Angelo Mercuri, Seven Hills, Ohio

[73] Assignee: UCAR Graph-Tech Inc., Lakewood, Ohio

[21] Appl. No.: 09/112,717

[22] Filed: Jul. 9, 1998

[51] Int. Cl.⁷ .................................................. H01M 4/86
[52] U.S. Cl. ............................ 429/44; 429/40; 501/99; 428/244; 428/408; 423/448
[58] Field of Search .................. 429/30, 34, 38, 429/39, 40, 42, 44; 501/99; 428/244, 408; 423/448

[56] References Cited

U.S. PATENT DOCUMENTS

| | | | |
|---|---|---|---|
| 3,404,061 | 10/1968 | Shane et al. | 161/125 |
| 4,190,257 | 2/1980 | Schnitzler | 277/102 |
| 4,226,821 | 10/1980 | Ishikawa et al. | 264/134 |
| 4,642,201 | 2/1987 | Vogel | 252/503 |
| 4,826,181 | 5/1989 | Howard | 277/112 |
| 4,895,713 | 1/1990 | Greinke et al. | 423/448 |
| 4,911,972 | 3/1990 | Mercuri | 428/99 |
| 4,988,583 | 1/1991 | Watkins et al. | 429/30 |
| 5,108,849 | 4/1992 | Watkins et al. | 429/30 |
| 5,176,863 | 1/1993 | Howard | 264/113 |
| 5,225,262 | 7/1993 | Leduc | 428/75 |
| 5,225,379 | 7/1993 | Howard | 501/99 |
| 5,228,701 | 7/1993 | Greinke et al. | 277/102 |
| 5,300,370 | 4/1994 | Washington et al. | 429/34 |
| 5,494,506 | 2/1996 | Ford et al. | 55/502 |
| 5,531,454 | 7/1996 | Borneby | 277/26 |
| 5,683,778 | 11/1997 | Crosier | 428/59 |
| 5,885,728 | 3/1999 | Mercuri et al. | 429/30 |

FOREIGN PATENT DOCUMENTS

| | | |
|---|---|---|
| 54-088911 | 7/1979 | Japan . |
| 63-157747 | 6/1988 | Japan . |
| 63-242395 | 10/1988 | Japan . |
| 1123991 | 5/1989 | Japan . |
| 8143856 | 6/1996 | Japan . |
| 8169478 | 7/1996 | Japan . |

OTHER PUBLICATIONS

WO 95/16287, David P. Wilkinson et al., Embossed Fluid Flow Field Plate for Electrochemical Fuel Cells, Publication Date Jun. 15, 1995.

*Primary Examiner*—Bruce F. Bell

[57] ABSTRACT

Flexible graphite sheet having embedded ceramic fibers extending from its opposite planar surfaces into the sheet to provide permeability of the sheet to gases so that it is useful as an electrode in electrochemical fuel cells.

21 Claims, 10 Drawing Sheets

FLEXIBLE GRAPHITE COMPOSITE

FIELD OF THE INVENTION

The present invention relates to a composite of flexible graphite and needle-shaped ceramic particles which can be used in the making of gaskets and also flow field plates and electrodes, anodes or cathodes, for use in fuel cells.

BACKGROUND OF THE INVENTION

The term "flexible graphite" as used herein represents the exfoliated reaction product of rapidly heated natural graphite particles which have been treated with an agent that intercalates into the crystal-structure of the graphite to expand the intercalated particles at least 80 or more times in the direction perpendicular to the carbon layers in the crystal structure. Flexible graphite and the making thereof is described in U.S. Pat. No. 3,404,061 Shane et al. Expanded, i.e. exfoliated graphite may be compressed into thin sheets (hereinafter referred as flexible graphite "foil") with a density approaching theoretical density, although a density of about 10 to 85 lbs./ft.$^3$ is suitable for most applications, including compression into shapes suitable as seal rings in engine exhaust and other applications.

A common method for making expandable graphite particles, described by Shane et al in U.S. Pat. No. 3,404,061 the disclosure of which is incorporated herein by reference. In the typical practice of this method, natural graphite flakes are intercalated by dispersing the flakes in a solution containing an oxidizing agent e.g., a mixture of nitric and sulfuric acid. The intercalation solution contains oxidizing and other intercalating agents known in the art. Examples include those containing oxidizing agents and oxidizing mixtures, such as solutions containing nitric acid, potassium chlorate, chromic acid, potassium permanganate, potassium chromate, potassium dichromate, perchloric acid, and the like, or mixtures, such as for example, concentrated nitric acid and chlorate, chromic acid and phosphoric acid, sulfuric acid and nitric acid, or mixtures of a strong organic acid, e.g. trifluoroacetic acid, and a strong oxidizing agent soluble in the organic acid. A preferred intercalating agent is a solution of a mixture of sulfuric acid, or sulfuric acid and phosphoric acid, and an oxidizing agent, i.e. nitric acid, perchloric acid, chromic acid, potassium permanganate, hydrogen peroxide, iodic or periodic acids, or the like. Although less preferred, the intercalation solutions may contain metal halides such as ferric chloride, and ferric chloride mixed with sulfuric acid, or a halide, such as bromine as a solution of bromine and sulfuric acid or bromine in an organic solvent. After the flakes are intercalated excess solution is drained from the flakes and after washing with water, the intercalated graphite flakes are dried and are expandable upon exposure to a flame for only a few seconds. The thus treated particles of graphite are hereafter referred to as "particles of intercalated graphite". Upon exposure to high temperature, the particles of intercalated graphite expand in dimension as much as 80 to 1000 or more times its original volume in an accordion-like fashion in the c-direction, i.e. in the direction perpendicular to the crystalline planes of the constituent graphite particles. The exfoliated graphite particles are vermiform in appearance, and are therefore commonly referred to as worms. The worms may be compressed together into flexible sheets which, unlike the original graphite flakes, can be formed and cut into various shapes.

Flexible graphite foil is coherent, with good handling strength, and flexible graphite foil can be wound into rolls and can also be wrapped around metal fixtures such as mandrels, possesses desirable heat transfer properties and is, accordingly, particularly useful for high temperature applications such as engine exhaust seal ring applications. It has been proposed to increase the sealability of flexible graphite sheet or foil by impregnating the same with resin. However, the surface layers of flexible graphite sheet or foil, due to the alignment of exfoliated graphite particles and the constituent layers of atoms parallel to the surface of the flexible sheet or foil, resist resin impregnation when the sheet or foil is immersed in liquid resin. However, due to the well known anisotropy of flexible graphite, resin will flow readily within the flexible graphite sheet in directions parallel to the opposed parallel planar surfaces of the sheet or foil and the planes of the constituent graphite particles of the sheet, i.e. transverse to the "c axis" direction of the graphite particles if penetration into the flexible graphite sheet can first be achieved.

SUMMARY OF THE INVENTION

The present invention relates to a composite of a resin containing thin sheet of flexible graphite having opposed parallel, planar outer surfaces and needle-shaped ceramic fiber particles which are embedded in the flexible sheet and which extend from the opposed planar outer surfaces of the flexible graphite sheet into the graphite sheet to provide the graphite sheet with permeability to gases so that it is useful as an electrode for electrochemical fuel cells.

DETAILED DESCRIPTION

In the practice of a particular embodiment of the present invention, intercalated natural graphite flakes are mixed and blended with from about 1.5 to 30% by weight of needle-shaped ceramic fiber particles having a length of 0.15 to 1.5 millimeters. The width of the particles should be from 0.04 to 0.004 mm. The ceramic fiber particles are non-reactive and non-adhering to graphite and are stable at temperatures up to 2000° F., preferably 2500° F. Suitable ceramic fiber particles are formed of macerated quartz glass fibers, carbon and graphite fibers, zirconia, boron nitride, silicon carbide and magnesia fibers, naturally occurring mineral fibers such as calcium metasilicate fibers, calcium aluminum silicate fibers, aluminum oxide fibers and the like.

The mixture of intercalated natural graphite flake and needle-shaped ceramic fiber particles, in which the graphite flake and ceramic fiber particles are in general alignment, is exposed to a flame at a temperature up to 2500° F. to exfoliate, i.e. expand the intercalated graphite flake into expanded graphite particles from 80 to 1000 times the volume of the unexpanded intercalated natural graphite flake which surround and entrap the needle-shaped ceramic fiber particles. Due to the expansion, the ceramic fiber particles are no longer in substantial alignment with the graphite particles but are randomly positioned in the mixture of exfoliated graphite and ceramic fiber. The mixture of exfoliated graphite particles and randomly oriented needle-shaped ceramic fiber particles is roll-pressed into sheet or foil typically 0.1 to 3.5 mm thick. The resultant sheet, or foil, is characterized by having needle-shaped particles extending from interior of the flexible graphite sheet to and through at least one of the opposed planar surfaces of the flexible graphite sheet. Since the needle-shaped ceramic fiber particles are non-reactive and non-adhering to the graphite in the flexible sheet, a plurality of annular channels surrounding the respective needle-shaped particles is provided in the flexible graphite sheet extending from the opposed surfaces of the sheet into the body of the sheet. These channels, with the flexible graphite sheet immersed in liquid resin, receive the resin which then infiltrates the flexible graphite sheet in the more permeable direction parallel to the planar surfaces of the flexible graphite sheet and the pressed, exfoliated graphite particles forming the sheet, assisted by channels formed by needle shaped ceramic fiber particles embedded between, but not penetrating the planar parallel surfaces of the flexible graphite sheet. The ceramic fiber particles remain stable during all steps of the processing treatment so that the channels are not blocked by melted fiber or fiber decomposition products. After curing of the resin within the graphite sheet the sealability of the flexible graphite sheet is enhanced for gaskets formed from said sheet. In a preferred embodiment the resin-containing sheet is calendered by roll pressing between pressure rolls.

Material for use as electrodes in fuel cell applications is pressed to a thickness in the range of 0.75 to 0.2 mm so that annular channels surrounding needle shaped ceramic particles extend from one of the parallel opposed surfaces of the flexible graphite sheet, through the sheet to the opposite parallel opposed surface. This enables the passage of fuel of oxidant gases or a fuel cell through the graphite sheet as required in fuel cell operation.

Figure 1:
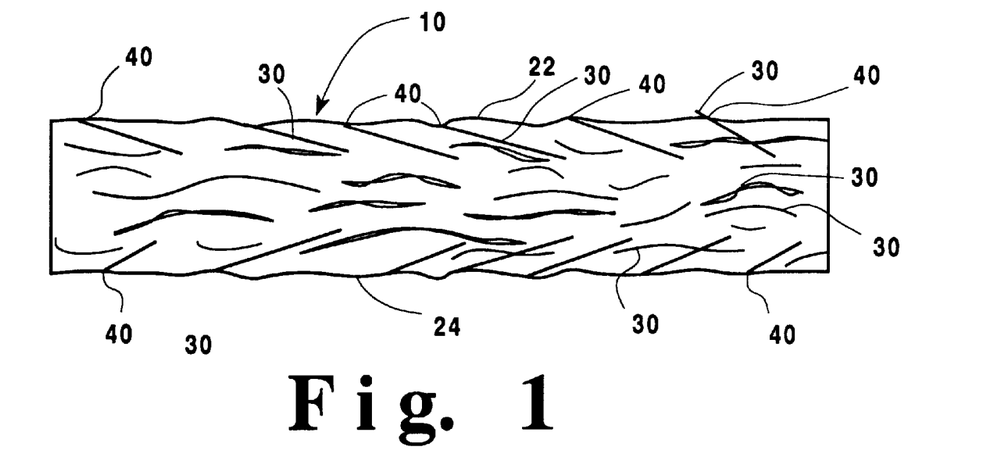
FIG. 1 shows, in an enlarged cross-section sketch of a sheet of flexible graphite (original thickness of 0.01 inch) containing ceramic fibers in accordance with the present invention.

FIG. 1 is a drawing sketch based on microscope observations of 0.01 inch thick sheets of flexible graphite which shows a flexible graphite sheet 10, in cross-section, with parallel opposed planar surfaces 22, 24. Embedded ceramic fiber particles are shown at 30. Penetration of sheet 10 by ceramic fibers 30 is illustrated at 40.

EXAMPLE I

Natural graphite flake, sized 80% by weight held on 50 mesh was treated in a mixture of 90 wt. % sulfuric acid and 10 wt. % nitric acid. The thus treated intercalated graphite flake was water washed and dried to about 1% by weight water. One (1) pound of this intercalated flake was mixed with 0.15 pounds of needle-shaped ceramic fiber of commercially available calcium metasilicate sized mostly with a 15 to 25 (l/w) aspect ratio. The mixture of intercalated graphite and calcium metasilicate fiber was introduced into a furnace of 2500° F. to obtain rapid expansion of the intercalated graphite flake into vermicular worm-shaped particles having a volume of about 325 times that of the unexpanded intercalated flake. The expanded worm-shaped particles surrounded the admixed calcium metasilicate fibers and the mixture was rolled into a flexible graphite sheet 0.01 inch thick and 24 inches wide in which admixed calcium metasilicate fibers extended from a surface of the sheet into the body of the sheet which contained about 12% by weight of the calcium metasilicate fiber.

Figure 2:
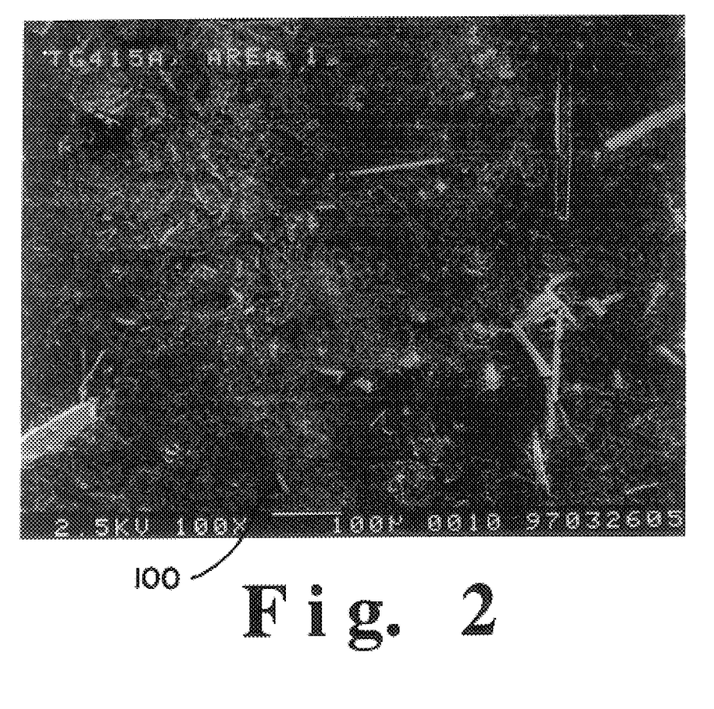
FIGS. 2 through 6 are electron microscope views (original magnification 100×) at increasing electron beam intensity voltages (2.5 KV to 40 KV) of a portion of a planar surface of a flexible graphite sheet containing ceramic fibers in accordance with the present invention.
Figure 3:
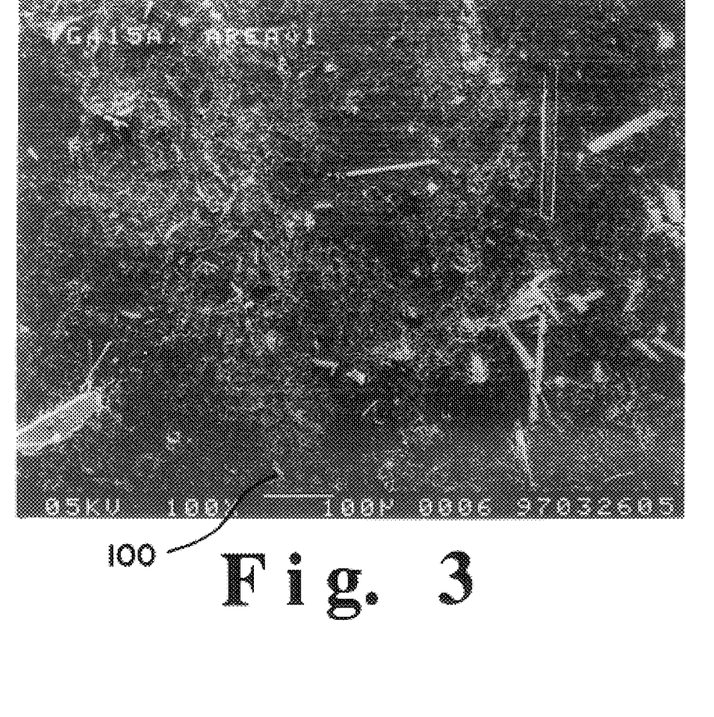
Figure 4:
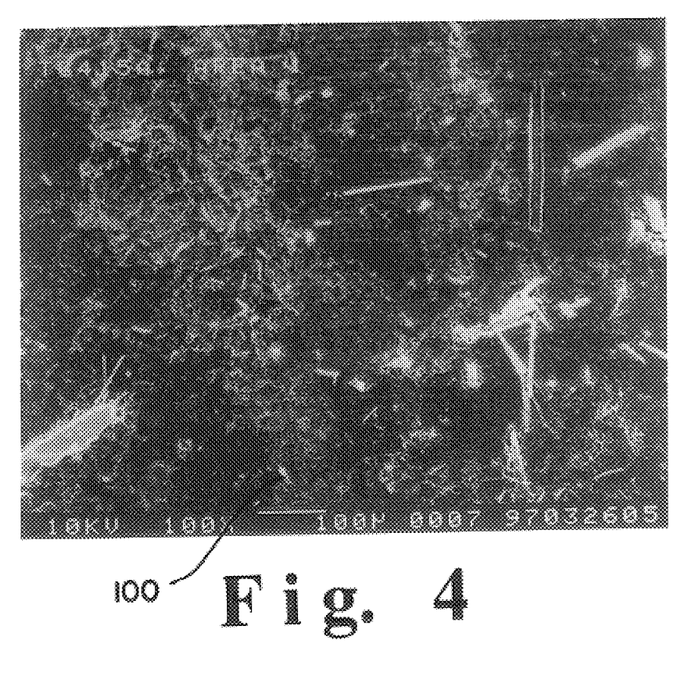
Figure 5:
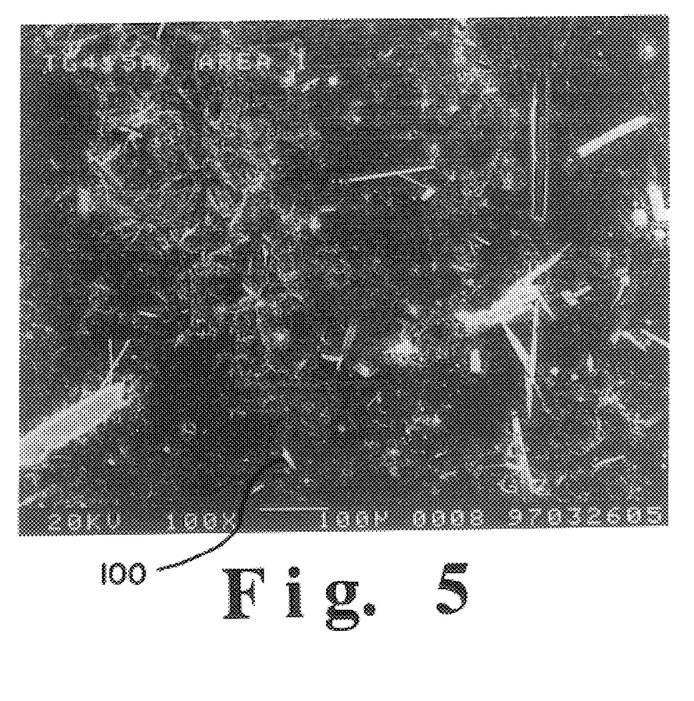
Figure 6:
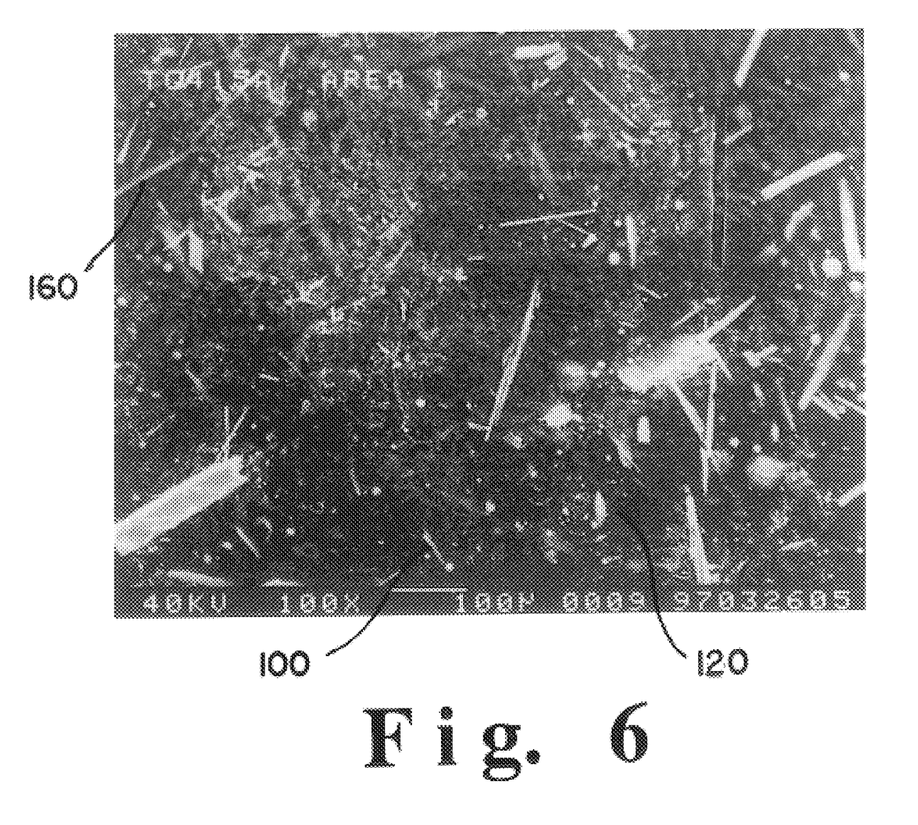

The electron microscope view of FIG. 2 (100×—see 100 micron scale) shows the upper portion of a ceramic fiber 100 which penetrates a planar surface 22 of a flexible graphite sheet. FIGS. 3 to 6, at increasing voltages, look "deeper" into the flexible graphite sheet and show the penetration of ceramic fiber 100 into the flexible graphite sheet. Ceramic fibers embedded in the flexible graphite sheet below surface 72 are shown at 140, 160.

EXAMPLE II

A sample of the sheet of Example I, 8 inches wide was immersed in and pulled through a solution 10% phenolic resin with acetone diluent at a rate of 10 feet per minute. After immersion and drying, the sample showed an increase in weight of 18.7%.

The sample was further treated by heating to 235° C. to cure and stabilize the resin and the sheet was calendered between pressure rolls to a density of 1.5 gms/cc. The calendered sheet was soaked in oil and water and was unaffected, i.e. impervious. A control sheet without any added ceramic fiber or resin additives exposed to the same test conditions increased about 35% in weight and 8% in thickness.

Sample sheets with 5%, 15% and 25% by weight of calcium metasilicate fibers as additive were pulled through the resin solution at a rate of 10 feet per minute and were saturated with resin at about 17–19% by weight of resin. A control sample without any added ceramic fiber retained only 5% by weight of resin at the same pull rate of 10 feet per minute.

EXAMPLE III

Figure 7:
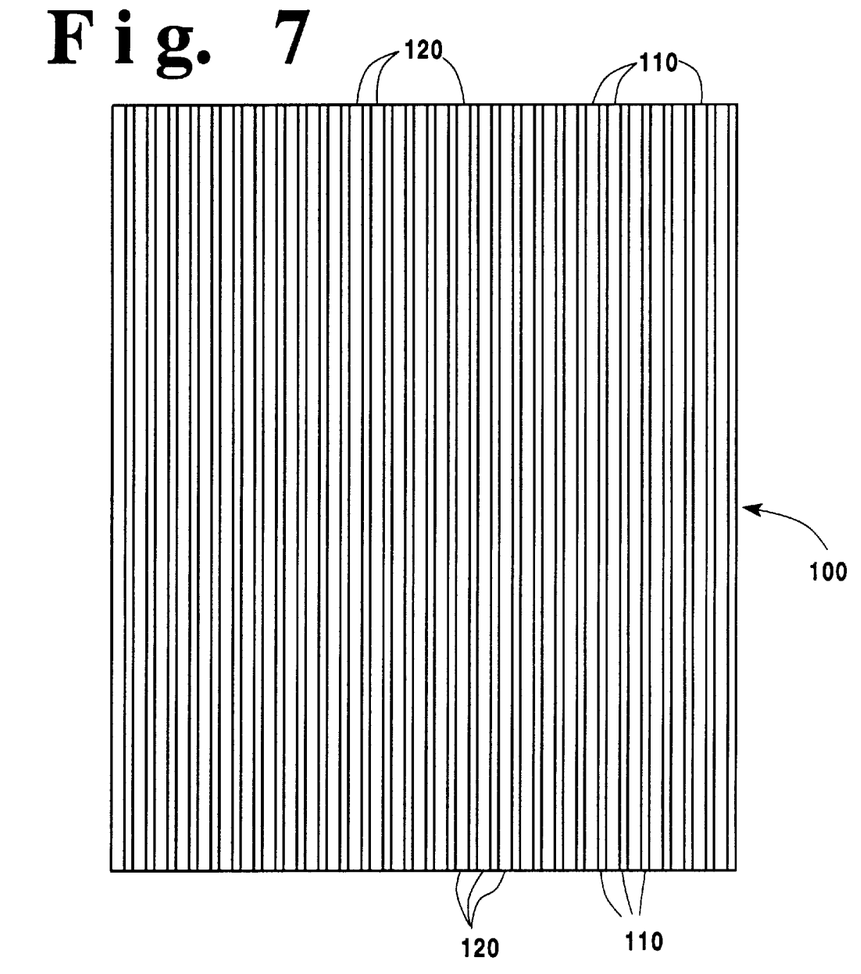
FIG. 7, 7A show a portion of a sheet of flexible graphite containing ceramic fibers in accordance with the present invention which has been mechanically deformed into a grooved plate for use as a flow field plate in a Fuel Cell.
Figure 7A:
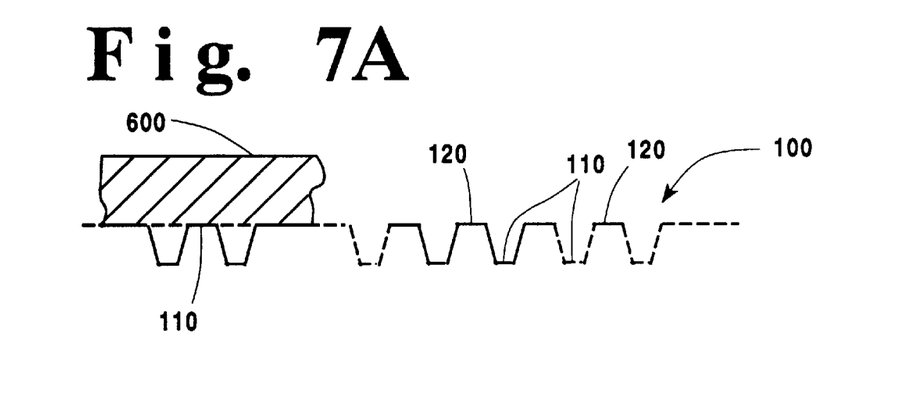

Calendered flexible graphite sheet material of the type described in Example I containing 5% by weight of calcium metasilicate fibers (100 mm×100 mm) was mechanically deformed by stamping into a shape as shown in the top and side views of FIGS. 7, 7A, which shape is useful as a fluid flow plate for a fuel cell. The plate 100 has multiple grooves separated by walls 120. The grooves 110 are typically 1.5 mm deep and 1–1.5 mm wide and extend to cover the electrode of the fuel cell. The walls 120 are typically 1–1.5 mm inch thick. The density before mechanical deformation is approximately 0.1 to 0.3 gm/cc and after stamping is typically exceeds 1.1 g/cc. The plate 100 of FIGS. 7, 7A is subjected to impregnation using the resin of Example II under pressure of about 15 psi to provide about 20% by weight of resin in the plate after being cured by heating to 235° C. The resin impregnated plate, as compared to prior art graphite plates with milled grooves, has increased flexural strength, improved heat dispersion and lower voltage drop across its thickness when in use as a fluid flow field plate in a fuel cell.

EXAMPLE IV

A one square foot sample of sheet containing 5% by weight fiber of the type described in Example I was immersed in the diluted resin solution of Example I for a period of 15 seconds such that the sheet contained a uniform distribution of 15% by weight resin. The sheet was dryed to a tack free condition (100° C.) and was mechanically deformed by stamping into a shape as shown in the top and side views of FIGS. 7, 7A, which shape is useful as a fluid flow plate for a fuel cell. The plate 100 has multiple grooves separated by walls 120. The grooves 110 are typically 1.5 mm deep and 1–1.5 mm wide and extend to cover the electrode of the fuel cell. the walls 120 are typically 1–1.5 mm inch thick. The density before mechanical deformation is approximately 0.1 to 0.3 gml/cc and after stamping is typically exceeds 1.1 g/cc. The plate 100 of FIGS. 7, 7A was then heated slowly to 235° C. to achieve the property improvements of Example III.

Figure 9:
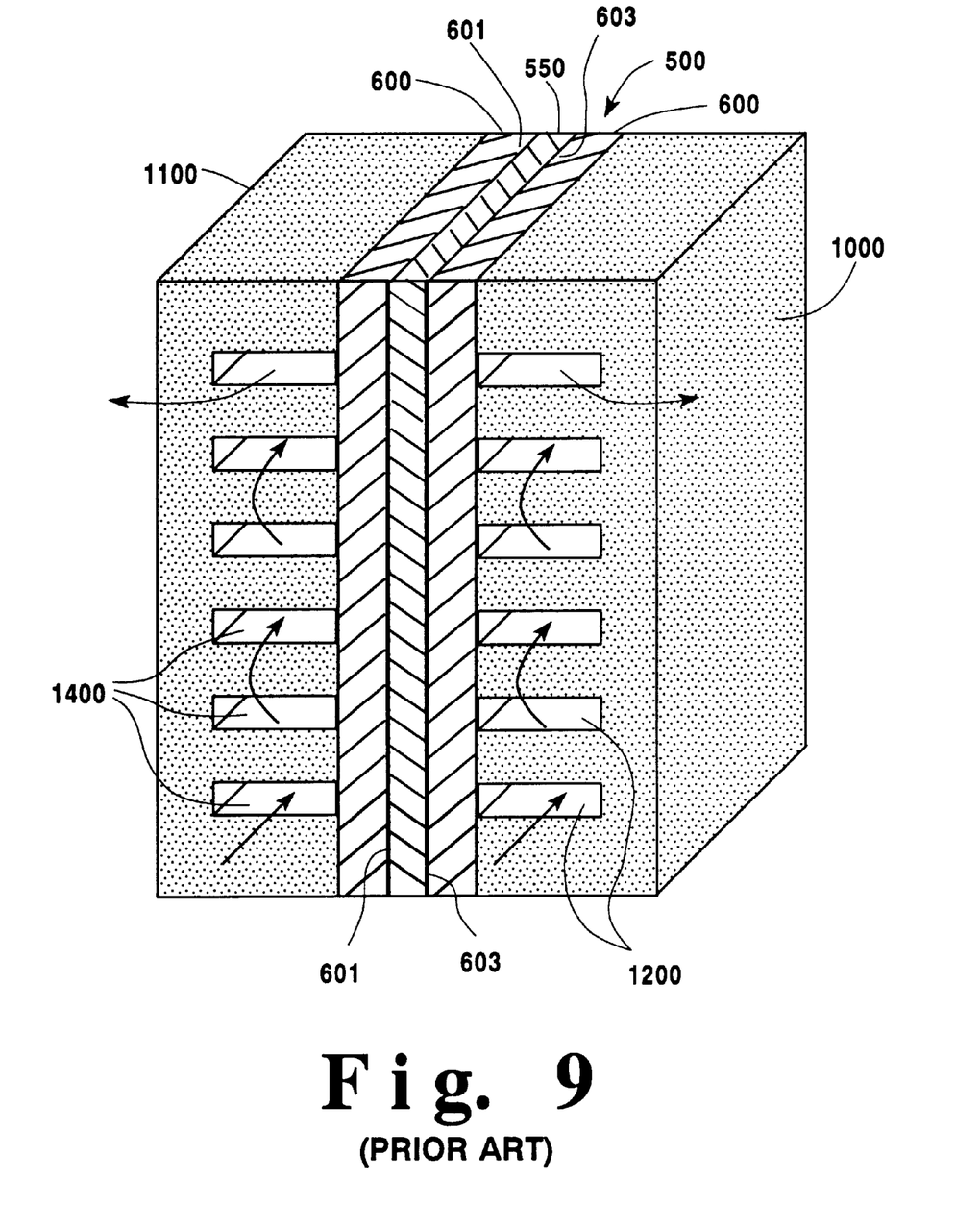
FIG. 9 shows, schematically, a prior art electrochemical fuel cell.

FIG. 9 shows, schematically, the basic elements of a Fuel Cell, more complete details of which are disclosed in U.S. Pat. Nos. 4,988,583 and 5,300,370 and PCT WO 95/16287 (Jun. 15, 1995) which are incorporated herein by reference.

With reference to FIG. 9, the Fuel Cell indicated generally at 500 comprises electrolyte in the form of a plastic e.g. solid polymer membrane electrolyte 550. Carbon fiber electrodes 600 coated at the electrode-membrane interfaces 601, 603 with a catalyst 600, e.g. platinum. Flow field plates 1000, 1100 abut the catalyst layers 600 and fuel, e.g. hydrogen gas, is circulated through grooves 1400 of oxidant flow field plate 1100. In operation, the fuel flow field plate 1000 becomes an anode, and the oxidant flow field plate 1100 becomes a cathode with the result that an electric potential, i.e. voltage is developed between the fuel flow field plate 1000 and the oxidant flow field plate 1100. The above described electrochemical fuel cell is combined with others in a fuel cell stack to provide the desired level of electric power as described in the above-noted U.S. Pat. Nos. 5,300,370 and 4,988,583.

Figure 8:
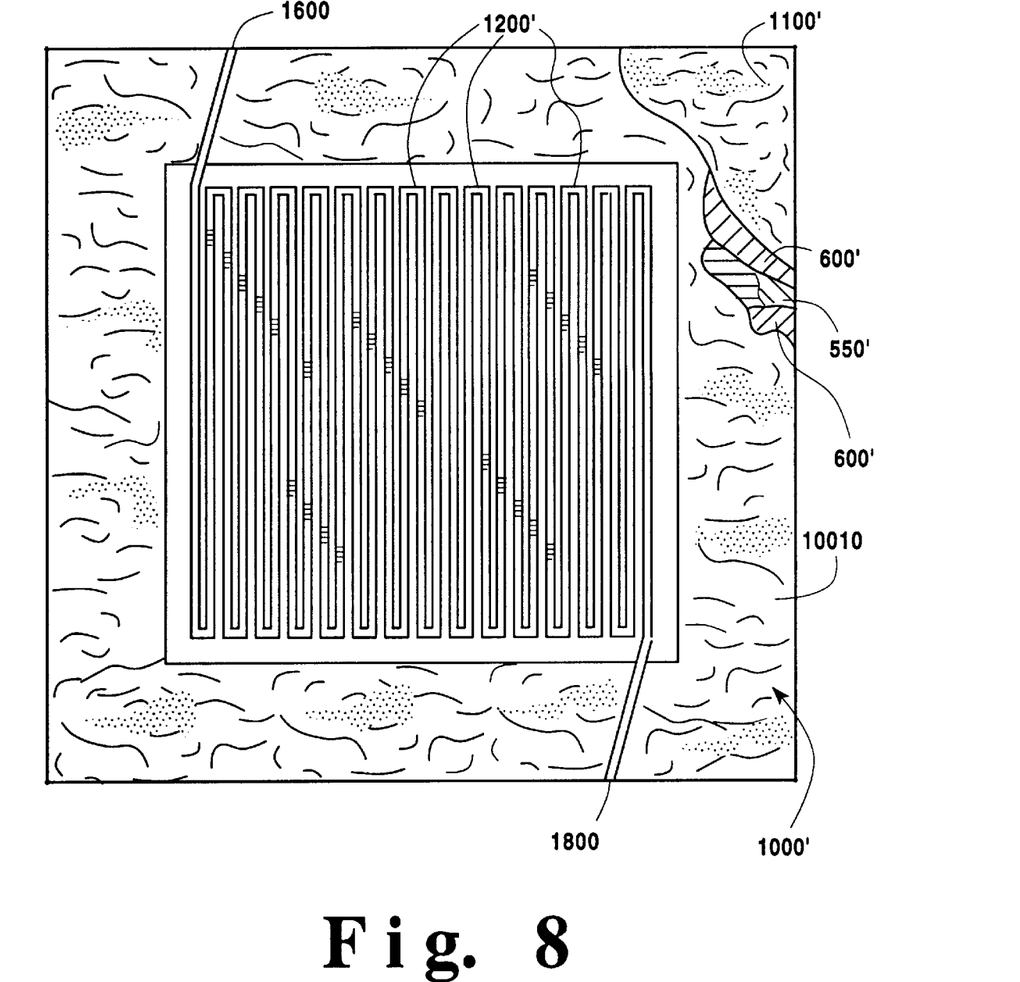
FIGS. 8, 8A show a top and partial side elevation view (in section) of flow field plates of this invention as components of a fuel cell.
Figure 8A:
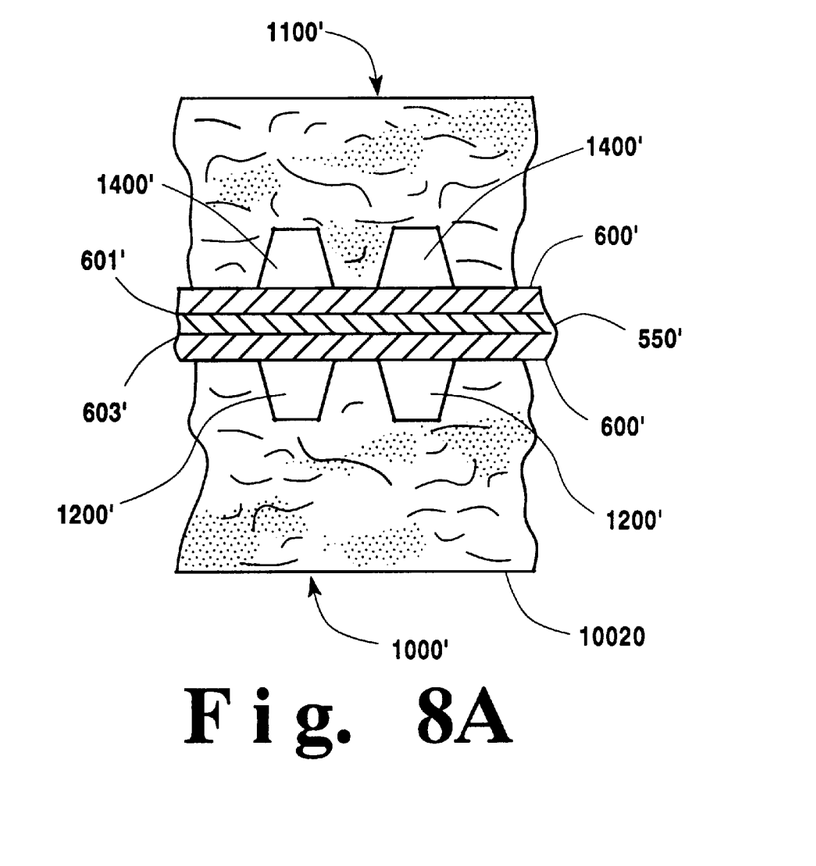

A fluid flow field plate 1000' having a continuous reactant flow channel, of the type described in Watkins U.S. Pat. No. 4,988,583, is shown in FIG. 8 and FIG. 8A The plate is resin containing flexible graphite sheet which contains 12% by weight calcium metasilicate fibers of the type described in Example III. A surface of plate 1000' has formed therein by stamping or molding, a single continuous fluid flow channel 1200' which has a fluid inlet 1600 and a fluid outlet 1800. Fluid inlet 1600 is connected to a source of fuel (not shown) in the case of the anode flow field plate, or a source of oxidant (not shown) for the cathode flow field plate. Channel 1200' traverses in a plurality of passes a major central area of plate 1000', which corresponds to the electrocatalytically active region of the anode or cathode to which it is adjacent when assembled as shown in FIG. 8A. When assembled in fuel cell stack, each flow field plate also functions as a current collector.

Figure 10:
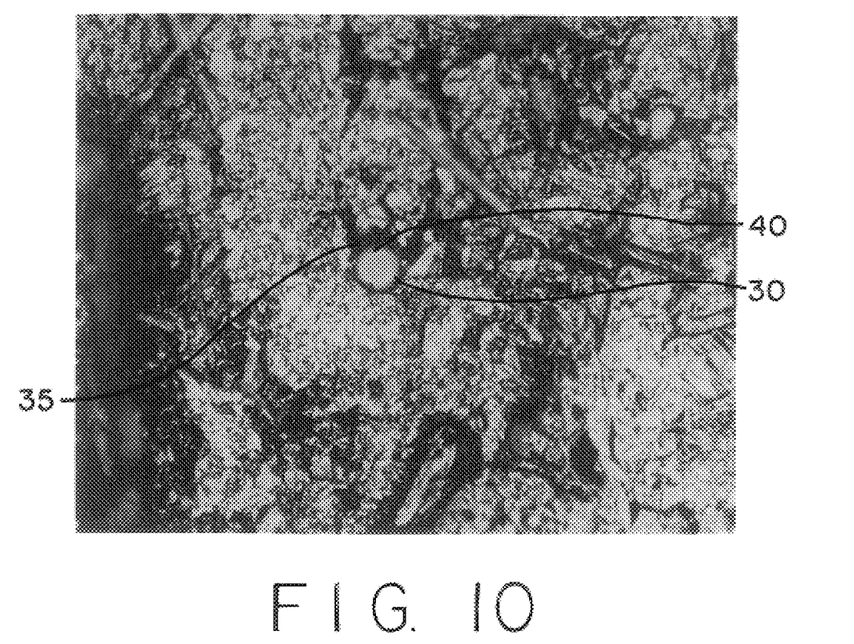
FIG. 10 is a photograph (original magnification of 200×) of a bright field microscopic examination of the planar surface of flexible graphite sheet containing ceramic fibers in accordance with the present invention.

FIG. 10 is an optical observation (200x) of a portion of the planar surface of a flexible graphite sheet containing ceramic fibers in accordance with the present invention. Penetration of the surface of the graphite sheet by a ceramic fiber 30 is shown at 40. The annular channel surrounding ceramic fiber 30 is shown at 35.

Figure 11:
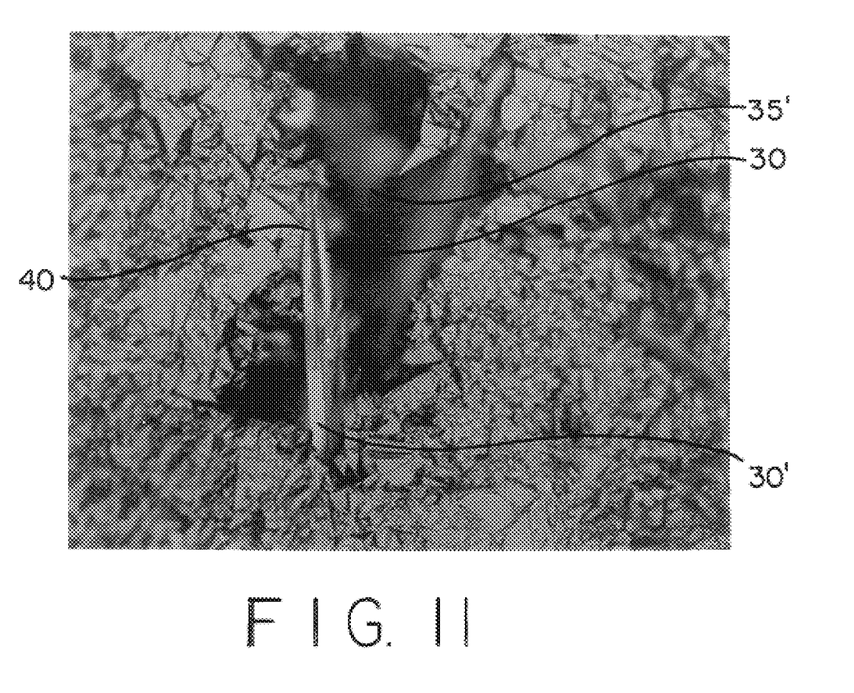
FIG. 11 is a photograph (original magnification of 400×) of a bright field microscopic examination of the surface of flexible graphite sheet containing ceramic fibers in accordance with the present invention.

FIG. 11, an optical observation at 400x shows two ceramic fibers 30, 30' with the fiber 30 penetrating the surface of the graphite sheet at 40. The fiber 30' being within the graphite sheet below the sheet surface. The surrounding annular channel is shown at 35'. Ceramic fibers 30' is within the flexible graphite sheet below ceramic fiber 30.

Figure 12:
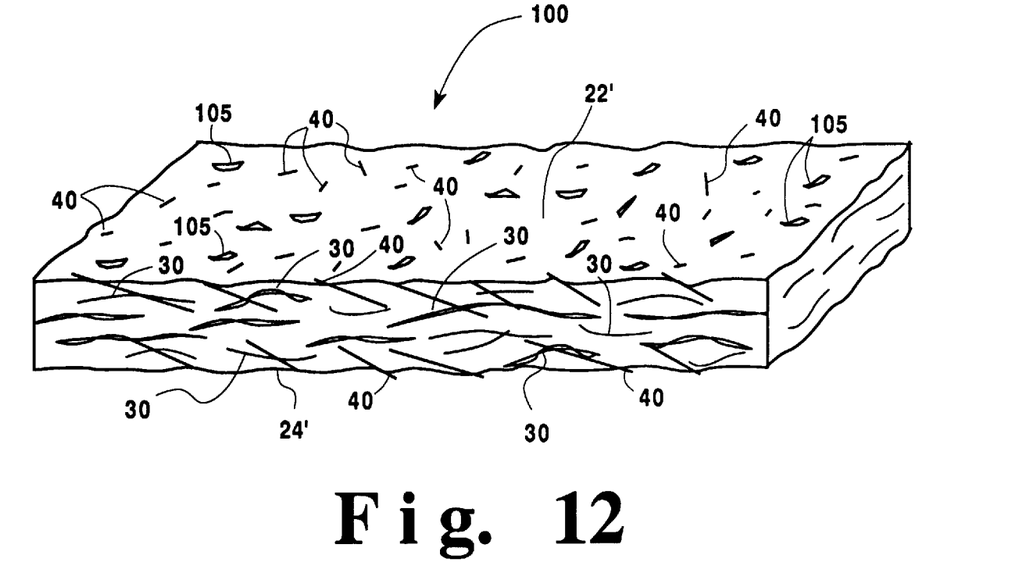
FIG. 12 shows an enlarged cross-section of a perspective view of a sheet of flexible graphite containing ceramic fibers in accordance with the present invention which is suitable for use as either the anode or cathode electrode in electrochemical fuel cells.
Figure 13:
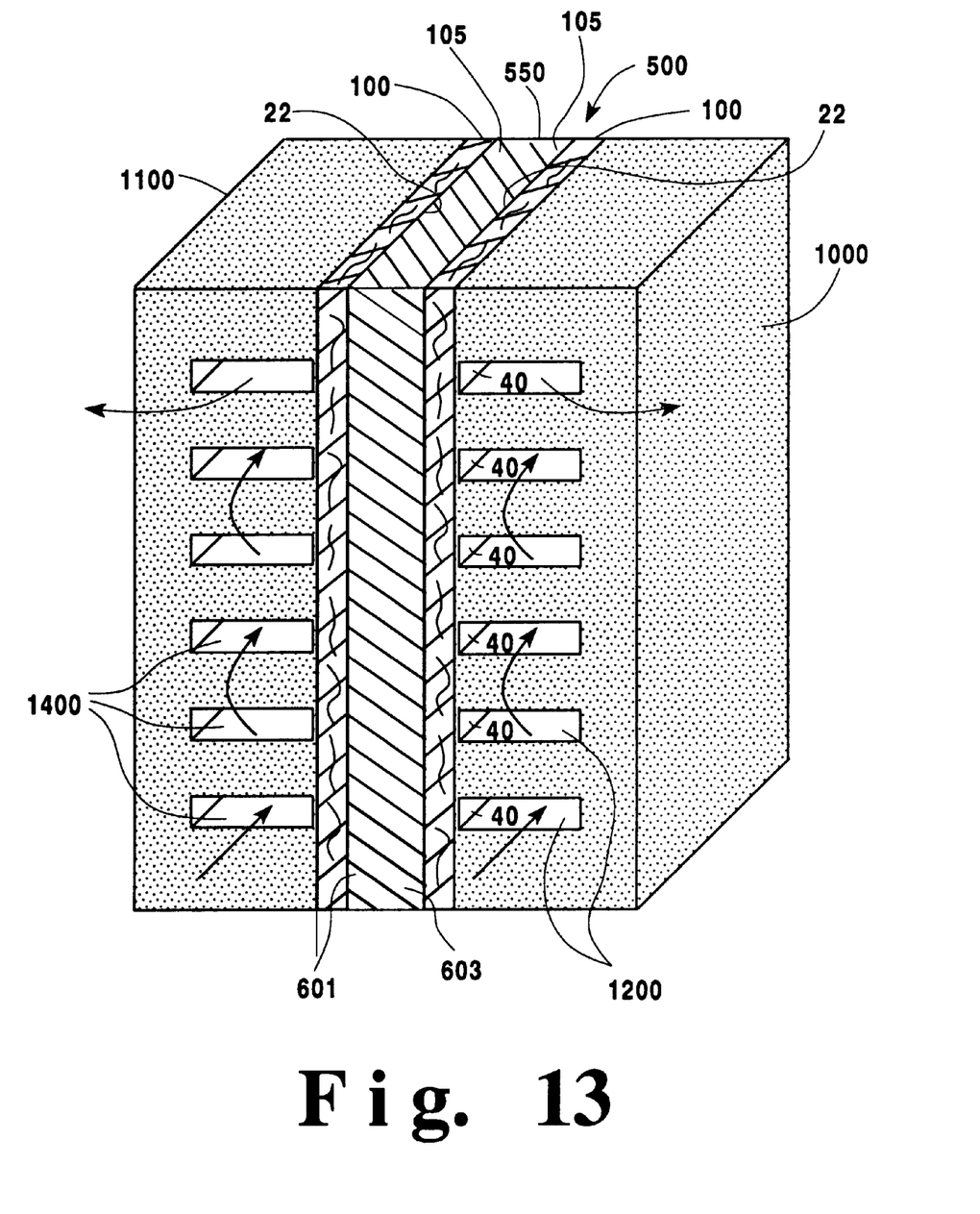
FIG. 13 shows a conventional electrochemical fuel cell incorporating electrodes in accordance with the present invention.

In the practice of a preferred embodiment of the present invention, a ceramic fiber containing flexible graphite sheet is platen or roll pressed to a thickness of from 0.75 mm to 0.2 mm with a density of from 0.5 to 1.5 grams per cubic centimeter so that, as shown in FIG. 12, ceramic fibers 30 extend between parallel planar surfaces 24', 22' of flexible graphite sheet 100 and penetrate the surfaces at 40 so that channels (shown at 35, 35'in FIGS. 10, 11) are provided which extend through the flexible graphite sheet 100 which is electrically conductive and also permeable to gases such as hydrogen and oxygen and consequently is useable as an electrode, in a fuel cell 500 as shown at 100 in FIG. 13 where a conventional solid polymer membrane electrolyte is indicated at 550 between flow field plates 1100, 1000. Flexible graphite sheets in the form of electrodes 100 are respectively contiguous to and overlie the grooves 1200, 1400 of the fluid flow plates and gases from the grooves can pass through the permeable electrodes 100 in the course of conventional operation of the fuel cell as described in the aforementioned U.S. Patents and the PCT patent publication. A dispersion of catalyst particles 105, e.g. finely divided platinum, palladium, can be provided on the planar surface 22 and interior of the electrodes 100 by conventional techniques, e.g., by applying catalyst to exfoliated graphite particles prior to expressing, to make the surface 22 electrochemically active. Planar surfaces 22 abut solid polymer membrane electrolyte 550. Catalyst can also be applied to the surfaces 22 just prior to the final pressing of the ceramic fiber containing sheet 100.

The mechanical strength of electrodes 100 can be enhanced by impregnating the electrodes 100 with liquid pitch or resin, e.g. by immersion in a liquid pitch or resin solution, the impregnation being facilitated by the channels surrounding the ceramic fibers in the electrode 100. The impregnated electrode is then subjected to an elevated temperature, e.g. 250°0 to 750°, to convert the pitch or resin, to a coke residue which has a reduced volume of about 60% of the initial resin amount in the electrode. This in effect reopens the channels surrounding the ceramic fibers and the coke residue forms a carbon-carbon bond with the flexible graphite sheet thus enhancing the mechanical properties, e.g., strength of the sheet. In this embodiment of the present invention catalyst is applied to the electrode subsequent to the coking of the resin or pitch.

What is claimed is:

1. An electrode for use in an electrochemical fuel cell in the form of a single, unitary, thin, pressed flexible graphite sheet having opposite, planar, parallel outer surfaces, said flexible graphite sheet having embedded therein a dispersion of a plurality of needle-shaped ceramic fiber particles which are non-reactive with flexible graphite and stable at temperatures up to 2000° F., said needle-shaped particles extending into said flexible graphite sheet from each said planar, parallel outer surface to provide channels extending through said flexible graphite sheet from one of said planar parallel outer surfaces to the other for the passage of fuel or oxidant gases through said flexible graphite sheet.

2. An electrode in accordance with claim 1 wherein said pressed flexible graphite sheet has a thickness of 0.075 to 0.2 mm.

3. An electrode in accordance with claim 1 wherein channels of said flexible graphite sheet are partially filled with resin coke residue.

4. An electrode in accordance with claim 1 wherein said flexible graphite sheet includes a catalyst which promotes electrochemical activity of gases in electrochemical fuel cell operation.

5. A combination of (i) an electrode in the form of a single, unitary, thin, pressed flexible graphite sheet having opposite, planar, parallel outer surfaces, said flexible graphite sheet having embedded therein a dispersion of a plurality of needle-shaped ceramic fiber particles which are non-reactive with flexible graphite and stable at temperatures up to 2000° F., said needle-shaped particles extending into and through said flexible graphite sheet from each said planar, parallel outer surface to provide channels extending through said flexible graphite sheet from one of said planar parallel outer surfaces to the other for the passage of fuel or oxidant gases through said flexible graphite sheet; and (ii) a fluid flow fuel plate having a grooved surface arranged contiguous and in register with said electrode to receive exhaust gaseous fuel or oxidant.

6. A planar article comprising a flexible graphite sheet having opposed generally planar surfaces, the flexible graphite sheet having embedded therein a plurality of needle-shaped ceramic particles which are non-reactive with the graphite sheet and stable at temperatures of at least about 2000° F., the needle-shaped particles extending into the flexible graphite sheet from each of the generally planar surfaces of the sheet to provide channels extending through the flexible graphite sheet from one of the generally planar surfaces to the other.

7. The article of claim 6 wherein the flexible graphite sheet is between about 0.075 and about 0.2 millimeters in thickness.

8. The article of claim 6 wherein the channels extending through the flexible graphite sheet are partially filled with coke residue.

9. The article of claim 6 wherein the ceramic particles are present in the graphite sheet at a level of about 1.5% to about 30% by weight.

10. The article of claim 9 wherein the ceramic particles are stable at temperatures of at least about 2500° F.

11. An electrode for use in an electrochemical fuel cell, the electrode comprising a flexible graphite sheet having opposed generally planar surfaces, the flexible graphite sheet having embedded therein a plurality of needle-shaped ceramic particles which are non-reactive with the graphite sheet and stable at temperatures of at least about 2000° F., the needle-shaped particles extending into the flexible graphite sheet from each of the generally planar surfaces of the sheet to provide channels extending through the flexible graphite sheet from one of the generally planar surfaces to the other for the passage of oxidant gases through the flexible graphite sheet.

12. The electrode of claim 11 wherein the flexible graphite sheet is between about 0.075 and about 0.2 millimeters in thickness.

13. The electrode of claim 11 wherein the channels extending through the flexible graphite sheet are partially filled with coke residue.

14. The electrode of claim 11 wherein the ceramic particles are present in the graphite sheet at a level of about 1.5% to about 30% by weight.

15. The electrode of claim 14 wherein the ceramic particles are stable at temperatures of at least about 2500° F.

16. The electrode of claim 11 wherein the flexible graphite sheet includes a catalyst which promotes the electrochemical activity of gases in electrochemical fuel cell operation.

17. A process for producing an electrode for use in an electrochemical fuel cell, the process comprising:
 a. admixing intercalated graphite flakes with needle-shaped ceramic particles which are non-reactive with the graphite flakes and stable at temperatures of at least about 2000° F. to form a blend;
 b. exposing the blend to temperatures sufficient to exfoliate the graphite flakes and form an exfoliated graphite/ceramic particle mixture;
 c. roll-pressing the exfoliated graphite/ceramic particle mixture to form a flexible graphite sheet having opposed generally planar surfaces, the flexible graphite sheet having embedded therein, a plurality of the ceramic particles, the needle-shaped particles extending into the flexible graphite sheet from each of the generally planar surfaces of the sheet to provide channels extending through the flexible graphite sheet from one of the generally planar surfaces to the other.

18. The process of claim 17 which further comprises infiltrating at least one of the channels extending through the flexible graphite sheet with a liquid resin and thereafter exposing the resin to temperatures sufficient to form a coke residue in the at least one channel.

19. The process of claim 17 wherein the ceramic particles are present in the blend at a level of about 1.5% to about 30%.

20. The process of claim 17 wherein the flexible graphite sheet is roll-pressed to a thickness of between about 0.075 and about 0.2 millimeters.

21. The process of claim 17 wherein the ceramic particles are stable at temperatures of at least about 2500° F.

* * * * *